US006755994B2

(12) United States Patent
Kikuta

(10) Patent No.: US 6,755,994 B2
(45) Date of Patent: Jun. 29, 2004

(54) FAR INFRARED RADIATION EMITTING MATERIAL

(75) Inventor: Shunichi Kikuta, Tokyo (JP)

(73) Assignee: Firbest Co., Ltd., Tokyo (JP)

( * ) Notice: Subject to any disclaimer, the term of this patent is extended or adjusted under 35 U.S.C. 154(b) by 0 days.

(21) Appl. No.: 10/244,758

(22) Filed: Sep. 17, 2002

(65) Prior Publication Data

US 2004/0043687 A1 Mar. 4, 2004

(30) Foreign Application Priority Data

Jul. 23, 2002 (JP) ....................................... 2002-214328

(51) Int. Cl.[7] .............................. G02B 1/04; G02B 1/00

(52) U.S. Cl. ....................................................... 252/587

(58) Field of Search ............................ 252/587; 501/87, 501/88, 91, 133, 134, 904

(56) References Cited

U.S. PATENT DOCUMENTS 4,927,651 A * 5/1990 Kumani et al. ............. 426/324
4,965,434 A * 10/1990 Nomura et al. ............. 392/407
5,151,463 A * 9/1992 Hayafune et al. ........... 524/430
5,234,985 A * 8/1993 Koo et al. .................. 524/492
5,419,855 A * 5/1995 Kikuta ........................ 252/587
5,542,194 A * 8/1996 Hanzawa et al. ............. 34/266
6,597,004 B2 * 7/2003 Imai ........................ 250/493.1

FOREIGN PATENT DOCUMENTS

EP 433097 A1 * 6/1991 ............ C08K/3/22

* cited by examiner

*Primary Examiner*—Matthew A. Thexton
(74) *Attorney, Agent, or Firm*—Armstrong, Kratz, Quintos, Hanson & Brooks, LLP

(57) ABSTRACT

To provide a novel far infrared radiation emitting material which can efficiently emit the thermal energy required for the excitation of water molecules contained in animal and vegetable bodies including human organizations, can be produced at a low cost and is highly usable in general-purpose applications. The far infrared radiation emitting material of the present invention comprises 60 to 90% by weight of at least one type selected from titanium dioxide and titanium carbide, 10 to 40% by weight of at least one type selected from silicon dioxide and silicon carbide and 0.01 to 0.5% by weight of an oxide of a rare earth metal. Further, a far infrared radiation emitting material having a plate, cylindrical or fibrous shape is formed of a composition containing this far infrared radiation emitting material and a synthetic resin and utilized.

2 Claims, 2 Drawing Sheets

Table 1 FORMULATION OF FAR INFRARED RADIATION EMITTING MATERIAL (PARTS BY WEIGHT) AND AMOUNT OF EMISSION OF FAR INFRARED RADIATION ($mW/cm^2$)

| Symbols of materials | A | B | C | D | E | F | G | H | I | J | K | L | M* | N* | O* | P* | Q* | R* | S* | T* | U* | V* | W* | X* | Y* | Z* |
|---|---|---|---|---|---|---|---|---|---|---|---|---|---|---|---|---|---|---|---|---|---|---|---|---|---|---|
| Components | | | | | | | | | | | | | | | | | | | | | | | | | | |
| $TiO_2$ | 90 | 70 | 60 | 90 | 70 | 60 | -- | -- | -- | -- | -- | -- | 95 | 40 | 95 | 40 | -- | -- | -- | -- | 100 | -- | -- | -- | 70 | -- |
| TiC | -- | -- | -- | -- | -- | -- | 90 | 70 | 60 | 90 | 70 | 60 | -- | -- | -- | -- | 95 | 40 | 95 | 40 | -- | 100 | -- | -- | -- | 70 |
| $SiO_2$ | 10 | 30 | 40 | -- | -- | -- | 10 | 30 | 40 | -- | -- | -- | 5 | 60 | -- | -- | 5 | 60 | -- | -- | -- | -- | 100 | -- | 30 | -- |
| SiC | -- | -- | -- | 10 | 30 | 40 | -- | -- | -- | 10 | 30 | 40 | -- | -- | 5 | 60 | -- | -- | 5 | 60 | -- | -- | -- | 100 | -- | 30 |
| $La_2O_3$ | 0.2 | -- | 0.2 | 0.2 | 0.2 | 0.2 | 0.2 | 0.2 | 0.2 | -- | 0.2 | 0.2 | 0.2 | 0.2 | -- | 0.2 | 0.2 | 0.2 | 0.2 | 0.2 | 0.2 | 0.2 | 0.2 | 0.2 | -- | -- |
| $Y_2O_3$ | -- | 0.1 | -- | -- | -- | -- | -- | -- | -- | 0.1 | -- | -- | -- | -- | 0.1 | -- | -- | -- | -- | 0.2 | -- | -- | -- | -- | -- | -- |
| $Nd_2O_3$ | 0.2 | 0.1 | 0.2 | 0.2 | 0.2 | 0.2 | 0.2 | 0.2 | 0.2 | 0.1 | 0.2 | 0.2 | 0.2 | 0.2 | 0.1 | 0.2 | 0.2 | 0.2 | 0.2 | -- | 0.2 | 0.2 | 0.2 | 0.2 | -- | -- |
| Amount of radiation $mW/cm^2$ | 5.5 | 5.4 | 5.3 | 5.2 | 5.5 | 5.4 | 5.2 | 5.3 | 5.0 | 5.0 | 5.4 | 5.2 | 4.3 | 4.1 | 3.8 | 4.2 | 4.0 | 3.9 | 4.2 | 4.4 | 3.8 | 3.6 | 3.5 | 3.4 | 3.3 | 3.5 |

*: Control Example

FIG. 1

Table 1 FORMULATION OF FAR INFRARED RADIATION EMITTING MATERIAL (PARTS BY WEIGHT) AND AMOUNT OF EMISSION OF FAR INFRARED RADIATION ($mW/cm^2$)

| Symbols of materials | A | B | C | D | E | F | G | H | I | J | K | L | M* | N* | O* | P* | Q* | R* | S* | T* | U* | V* | W* | X* | Y* | Z* |
|---|---|---|---|---|---|---|---|---|---|---|---|---|---|---|---|---|---|---|---|---|---|---|---|---|---|---|
| Components | | | | | | | | | | | | | | | | | | | | | | | | | | |
| $TiO_2$ | 90 | 70 | 60 | 90 | 70 | 60 | -- | -- | -- | -- | -- | -- | 95 | 40 | 95 | 40 | -- | -- | -- | -- | 100 | -- | -- | -- | 70 | -- |
| TiC | -- | -- | -- | -- | -- | -- | 90 | 70 | 60 | 90 | 70 | 60 | -- | -- | -- | -- | 95 | 40 | 95 | 40 | -- | 100 | -- | -- | -- | 70 |
| $SiO_2$ | 10 | 30 | 40 | -- | -- | -- | 10 | 30 | 40 | -- | -- | -- | 5 | 60 | -- | -- | 5 | 60 | -- | -- | -- | -- | 100 | -- | 30 | -- |
| SiC | -- | -- | -- | 10 | 30 | 40 | -- | -- | -- | 10 | 30 | 40 | -- | -- | 5 | 60 | -- | -- | 5 | 60 | -- | -- | -- | 100 | -- | 30 |
| $La_2O_3$ | 0.2 | -- | 0.2 | 0.2 | 0.2 | 0.2 | 0.2 | 0.2 | 0.2 | -- | 0.2 | 0.2 | 0.2 | 0.2 | -- | 0.2 | 0.2 | 0.2 | 0.2 | 0.2 | 0.2 | 0.2 | 0.2 | 0.2 | -- | -- |
| $Y_2O_3$ | -- | 0.1 | -- | -- | -- | -- | -- | -- | -- | 0.1 | -- | -- | -- | -- | 0.1 | -- | -- | -- | -- | 0.2 | -- | -- | -- | -- | -- | -- |
| $Nd_2O_3$ | 0.2 | 0.1 | 0.2 | 0.2 | 0.2 | 0.2 | 0.2 | 0.2 | 0.2 | 0.1 | 0.2 | 0.2 | 0.2 | 0.2 | 0.1 | 0.2 | 0.2 | 0.2 | 0.2 | -- | 0.2 | 0.2 | 0.2 | 0.2 | -- | -- |
| Amount of radiation $mW/cm^2$ | 5.5 | 5.4 | 5.3 | 5.2 | 5.5 | 5.4 | 5.2 | 5.3 | 5.0 | 5.0 | 5.4 | 5.2 | 4.3 | 4.1 | 3.8 | 4.2 | 4.0 | 3.9 | 4.2 | 4.4 | 3.8 | 3.6 | 3.5 | 3.4 | 3.3 | 3.5 |

*: Control Example

FIG. 2

[Table 2]

TIMBER DRY TEST (OAK MATERIAL)

| Resin plate for a test dry warehouse (far infrared radiation emitting material) | | PB B | PM* M* |
|---|---|---|---|
| Moisture inclination | Δ% | | |
| Moisture content: | 27% to 25% | 17 | 35 |
| Moisture content: | 27% to 25% | 1.5 | 5 |
| Necessary drying time | 7% to 5% | 192 | 220 |
| Necessary energy | Hrs | | |
| Amount of consumed power | kWH | 444 | 467 |
| Amount of consumed kerosene | L | 372 | 382 |
| Ratio of generation of damages | % | 3.8 | 13.7 |

*: Control Example

FIG. 3

[Table 3]

HEAT RETAINING PROPERTY OF UNDERWEAR - SKIN TEMPERATURE (°c)

| Test grey sheeting underwear (Far infrared radiation emitting material) | | Ha ---- | HK K | HS* S* |
|---|---|---|---|---|
| Time passed | Just after undressed | 32.0 | 33.0 | 32.4 |
| | After 10 minutes | 29.0 | 32.0 | 31.0 |
| | After 20 minutes | 28.4 | 31.6 | 30.2 |
| | After 30 minutes | 28.0 | 31.0 | 29.0 |

*: Control Example

FAR INFRARED RADIATION EMITTING MATERIAL

BACKGROUND OF THE INVENTION

1. The Field of the Invention

The present invention relates to a novel far infrared radiation emitting material and also relates to a far infrared radiation emitting material utilized for drying various materials, for imparting functions such as thermal insulation to medical equipment and instruments and clothes and for air-conditioning and hair dressing and beauty.

2. The Description of the Related Art

As conventional far infrared radiation emitting materials, various ceramics including alumina, titania, zirconia and silica are proposed. These materials are used in air conditioning and medical applications as well as applications such as heating, cooling and drying of products by improving heat-absorption and heat-radiation efficiency using these materials.

In order to make thermal energy act on products and human organisms by utilizing far infrared radiation, it is necessary to efficiently radiate far infrared radiation according to the rotational oscillation wavelength of a water molecule contained in these subjects on which the far infrared radiation acts. However, these conventional far infrared radiation emitting materials are not necessarily superb in the radiation efficiency of far infrared radiation suited to the excitation of water molecules.

On the other hand, the inventor of the present invention has invented a far infrared radiation emitting material (JP No. 2137667) capable of efficiently emitting the thermal energy required for the excitation of water molecules contained in animal and vegetable bodies including human organizations. This far infrared radiation emitting material however has the problem of high production costs.

In view of this situation, it is an object of the present invention to provide a novel far infrared radiation emitting material which can efficiently emit the thermal energy required for the excitation of water molecules contained in animal and vegetable bodies including human organizations, can be produced at a low cost and is highly usable in general-purpose applications.

SUMMARY OF THE INVENTION

A far infrared radiation emitting material according to the present invention by which the aforementioned object is attained is a material comprising 60 to 90% by weight of at least one type selected from titanium dioxide and titanium carbide, 10 to 40% by weight of at least one type selected from silicon dioxide and silicon carbide and 0.01 to 0.5% by weight of an oxide of a rare earth metal.

Also, the far infrared radiation emitting material of the present invention may be a far infrared radiation emitting material formed of a composition containing the aforementioned far infrared radiation emitting material and a synthetic resin and having a plate, cylindrical, sheet or fibrous shape or may be one obtained by processing this far infrared radiation emitting material.

BRIEF DESCRIPTION OF THE DRAWINGS

FIG. 1 shows TABLE 1, which indicates the result of a test in which measures the amount of far infrared radiation emission from a specimen of the far infrared radiation emitting material of the invention;

FIG. 2 shows TABLE 2, which indicates the result of a test for drying the timbers by means of the test material; and FIG. 3 shows TABLE 3, which indicates the far infrared radiation emitting material of the invention having a higher body-temperature retaining effect.

DESCRIPTION OF THE EMBODIMENTS

The titanium component contained in the far infrared radiation emitting material of the present invention is at least one type selected from titanium dioxide and titanium carbide. The content of the titanium component is 60 to 90% by weight. When the content exceeds 90% by weight, the efficiency of the far infrared radiation emission is lowered whereas even when the content is less than 60% by weight, the efficiency of the far infrared radiation emission is also lowered and therefore the content out of the above defined range is undesirable.

Also, the silicon component contained in the far infrared radiation emitting material of the present invention is at least one type selected from silicon dioxide and silicon carbide. The content of the silicon component is 10 to 40% by weight. When the content exceeds 40% by weight, the efficiency of the far infrared radiation emission is lowered whereas even when the content is less than 10% by weight, the efficiency of the far infrared radiation emission is also lowered and therefore the content out of the above defined range is undesirable.

Moreover, the oxide of a rear earth metal includes oxides of rear earth metals such as lanthanum, neodymium and yttrium. Particularly when the content is 0.01% by weight or more, the oxide of a rear earth metal has the effect of improving the efficiency of far infrared radiation emission. On the other hand, when the content is less than 0.01% by weight, no improvement in the efficiency of far infrared radiation emission is expected. Also, compounding the oxide in an amount larger than 0.05% by weight or more gives rise to an economical problem and is therefore unpractical.

Even if a small amount of alumina, zirconia, alkali metal oxides, alkali earth metal oxides, oxides of group-VIII metals and the like is further contained in such a far infrared radiation material according to the present invention, no particularly serious problem arises if the content of these materials is 5% by weight or less. Although each of these components may be contained in the form of a single oxide or the like, each may be contained in the form of a complex oxide or the like.

Each component constituting the far infrared radiation emitting material of the present invention may be used either as a composition in which each is mixed in the form of a powder or one obtained by compounding some or all of these components, thereafter calcinating the mixture at high temperatures and further pulverizing the calcined product. The far infrared radiation emitting material thus obtained preferably has a particle diameter small enough to obtain fine particles from the viewpoint of blending operability and molding process ability when subjected to various processings as will be explained later.

The far infrared radiation material of the present invention as aforementioned may be molded into various forms such as a film, sheet, plate and tube by using, for example, a synthetic resin as a binder and applied. Also,the far infrared radiation emitting product may be utilized as far infrared radiation emitting fibers by kneading it into polymeric materials to spin. In addition, the far infrared radiation emitting material of the present invention may be mixed when making paper to form a far infrared radiation emitting sheet. Such a sheet or plate may be subjected to secondary molding to form molded articles having various shapes. Further, the far infrared radiation emitting material of the present invention may be used as a far infrared radiation emitting paints by compounded it with appropriate binders or solvents.

Water in a living body is associated with a polymer of the living body to form a hydrate cluster, so that it easily absorbs far infrared radiation having a wavelength of the order of 6 to 12 μm. The far infrared radiation emitting material of the present invention can efficiently emit far infrared radiation having a wavelength ranging widely from 4 to 20 μm or more and can be therefore utilized in equipment used to heat and dry foods and other materials obtained from, for instance, animals and vegetables efficiently. The far infrared radiation emitting material of the present invention may be utilized for medical instruments and equipment as well as clothes and building materials and can exhibit more superb abilities than conventional far infrared radiation emitting materials.

TEST EXAMPLE 1

A titanium dioxide powder (particle diameter: 0.15 μm), a titanium carbide powder (particle diameter: 0.3 μm), a silicon dioxide powder (particle diameter: 0.05 μm), a silicon carbide powder (particle diameter: 0.1 μm), a lanthanum oxide powder (particle diameter: 0.2 μm), a neodymium oxide powder (particle diameter: 0.15 μm) and yttrium oxide powder (particle diameter: 0.2 μm) were mixed according to each formulation shown in Table 1, to obtain far infrared radiation emitting materials A to L according to the present invention and far infrared radiation emitting materials M to Z as control products.

Each of these far infrared radiation emitting materials was compounded in an amount of 50 parts by weight with 100 parts by weight of a high density polyethylene resin and the mixture was kneaded using a kneading extruder (KCK model) manufactured by Toyo Tester at a rotation of 150 rpm at a resin temperature of 200° C. for 10 minutes to obtain a pellet. This pellet was subjected to an extruder to form a sheet, which was then processed by a hot press to produce a 0.5-mm-thick sheet body.

A 7 cm×7 cm test specimen was cut out of each of these sheet bodies and measured for the amount ($mW/cm^2$) of emission of far infrared radiation by using a far infrared radiation power meter (TMM-P-10, manufactured by FEROTEX) at 36° C. The results are shown in FIG. 1, which shows Table 1.

As to the value of the amount of the emission of far infrared radiation, a value of 5 $mW/cm^2$ or more exceeding the amount (4.5 $mW/cm^2$ at 36° C.) of the emission of the far infrared radiation emitted from a human body according to the amount of radiation prescribed by Far Infrared Radiation Association (Foundation) by 10% was defined as "effective".

TEST EXAMPLE 2

A far infrared radiation emitting material B according to the present invention was compounded in an amount of 10 parts by weight with 100 parts by weight of a polypropylene resin in the same manner as above to manufacture a 90-cm-long, 90-cm-wide and 0.8-mm-thick far infrared radiation emitting resin plate PB. Then, this resin plate was applied to the ceiling surface and left and right wall surfaces of an IF-model steam wood dry warehouse (manufactured by Hildebrandt) having a width of 2 mm, a length of 5.8 m and a height of 2.1 m by using a heat resistant pressure sensitive adhesive double coated tape.

Next, oak timbers each having a thickness of 34 mm, a width of 15 to 35 cm and a length of 180 to 260 cm in a total volume of 6.2 cubic meters were loaded on crosspieces in the foregoing dry warehouse and the test material was disposed in the center of these timbers. Then, a test for drying the timbers was made on such a drying schedule that a dry-bulb temperature was raised from 50° C. to 70° C. and the wet-bulb temperature was raised from 39° C. to 68° C. to measure each of the moisture inclination, the time required for drying, energy consumption and the ratio of the generation of damages until the moisture content of the timber reached a target moisture content, namely, 7 to 10% from 30%. The results are shown in Table 2.

The moisture inclination was measured using a resistance moisture meter (HT-85, manufactured by GANN) in the following manner. An electrode needle was driven in the test material up to a depth of 5 mm from the surface layer and up to the center position thereof, to read each value (%) of the moisture contents at both positions during the course of the drying when the moisture content of the timber was in a range from 27% to 25% to calculate a difference between the resulting moisture contents and this difference was defined as the moisture inclination (Δ %). Also, the value of the moisture content of each position was read in the same manner as above when the moisture content of the timber reached 7 to 5% at the time of completion of the drying to also find the moisture inclination (Δ %) at this time.

On the other hand, the necessary energy consumed to dry the timbers was found by measuring the amount (kWH) of electric power and the amount (L) of kerosene respectively by using each instrument. Moreover, the damages of the timber caused by the drying were found by visually confirming the presence or absence of small cracks, front surface cracks, internal cracks and collapses on all the timbers before and after dried and the ratio of the volume of timbers with defects generated caused by the drying was defined as the ratio (%) of the generation of damages.

A resin plate PM* having the same shape was produced in the same manner as above except that the far infrared radiation emitting material M* for a control was used in place of the far infrared radiation emitting material B. A dry warehouse in which this resin plate was applied to the side wall surfaces, ceiling surface and left and right wall surfaces thereof in the same manner as above was prepared. Then, a test for drying the timber was made in the same manner as above and the same measurement as above was made. The results are shown together with other results in Table 2 shown in FIG. 2.

It is understood from Table 2 shown in FIG. 2 that as compared with the dry warehouse prepared by applying the resin plate PM* as a control product, the dry warehouse prepared by applying the resin plate PB using the far infrared radiation emitting material B of the present invention decreases moisture inclination, reduces the ratio of the generation of damages, makes drying time short and requires only small energy consumption when drying timbers.

TEST EXAMPLE 3

One part by weight of the far infrared radiation emitting material K of the present invention was compounded in 100 parts by weight of a polyester resin for fiber spinning to obtain a master batch, which was then melt-spun to produce 1.25 denier polyester staple. A yarn count 30 cotton combined yarn which was produced by fiber spinning by mixing this staple in an amount of 20% with cotton yarn was used to knit a grey sheeting underwear HK by using a circular knitting machine.

Also, a polyester staple was produced in the same manner as above except that the far infrared radiation emitting material S* as a control product was used in place of the far infrared radiation emitting material K of the present invention. Further, the same cotton combined yarn as above was produced to knit a grey sheeting underwear HS* as a control product. Then, a grey sheeting underwear Ha produced as a standard product by knitting using a yarn count 30 cotton yarn was also prepared.

Each of these three types of grey sheeting underwear was worn for 30 minutes in a room kept at 23±1° C. under a humidity of 50%. The skin temperature of the back just after each underwear was taken off was measured using a thermography (TVS-2000, manufactured by Abionix). Then, in succession, a change in the temperature of each skin with time was measured in the same manner as above. It is to be noted that the positions of the back at which the temperature was measured were five positions, namely, the neck, the left and right shoulders and the left and right wastes. An average temperature (° C.) of each measured value was calculated. The results are indicated in Table 3 shown in FIG. 3.

As seen in Table 3, it is understood that the grey sheeting underwear HK using the far infrared radiation emitting material K of the present invention has a higher body-temperature retaining effect than the grey sheeting underwear HS* using the far infrared radiation emitting material S* as the control product and than the grey sheeting underwear Ha as the standard product.

The far infrared radiation emitting material of the present invention is constituted of a material having high generality, can be provided at a relatively low cost and can also efficiently emit far infrared radiation having a range of a wavelength easily absorbed by water contained in biological organizations such as animals, vegetables and human organizations. Therefore, the far infrared radiation emitting material of the present invention has an excellent effect when it is used in a wide range of applications such as various types of processing, e.g., drying, cold storage and refrigeration of various materials including foods, growth of agricultural and marine products, impartation of functions such as hot insulation to medical machines and instruments, clothes and the like, air conditioning and hair dressing and beauty.

What is claimed is:

1. A far infrared radiation emitting material comprising 60 to 90% by weight of at least one type selected from titanium dioxide and titanium carbide, 10 to 40% by weight of at least one type selected from silicon dioxide and silicon carbide and 0.01 to 0.5% by weight of an oxide of a rare earth metal.

2. A far infrared radiation emitting material formed of a composition containing a synthetic resin and the far infrared radiation emitting material as claimed in claim 1 and having a plate, cylindrical, sheet or fibrous shape.

* * * * *